(12) United States Patent
Duquesne et al.

(10) Patent No.: US 8,920,226 B2
(45) Date of Patent: Dec. 30, 2014

(54) INTAKE FEEDER SYSTEM FOR A COMBINE HARVESTER

(75) Inventors: Frank R. G. Duquesne, Zwevegem (BE); Tom N. N. Somers, Lotenhulle (BE); Stefaan Ballegeer, Beernem (BE); Andre G. J. Dhont, Maldegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/474,272

(22) Filed: May 17, 2012

(65) Prior Publication Data

US 2013/0310120 A1 Nov. 21, 2013

(51) Int. Cl.
*A01D 75/18* (2006.01)
*A01F 12/16* (2006.01)
*A01F 21/00* (2006.01)

(52) U.S. Cl.
USPC ............................................. 460/105

(58) Field of Classification Search
USPC ...................... 460/105, 59, 117, 16
See application file for complete search history.

(56) References Cited

U.S. PATENT DOCUMENTS

| | | | | |
|---|---|---|---|---|
| 1,099,070 A * | 6/1914 | McConnell | | 460/109 |
| 2,305,159 A * | 12/1942 | Heckman et al. | | 460/106 |
| 3,187,491 A * | 6/1965 | Karlsson | | 56/13.3 |
| 3,664,348 A * | 5/1972 | Maiste et al. | | 460/105 |
| 3,669,124 A * | 6/1972 | De Coene et al. | | 460/59 |
| 3,757,797 A * | 9/1973 | Mathews | | 460/91 |
| 3,771,530 A * | 11/1973 | Wassell | | 460/105 |
| 4,209,024 A * | 6/1980 | Powell et al. | | 460/70 |
| 4,335,562 A | 6/1982 | Meyers et al. | | |
| 4,484,588 A * | 11/1984 | Huhman et al. | | 460/106 |
| 4,538,625 A * | 9/1985 | Fortune et al. | | 460/105 |
| 5,024,631 A * | 6/1991 | Heidjann et al. | | 460/75 |
| 5,186,683 A | 2/1993 | Farley et al. | | |
| 5,273,488 A * | 12/1993 | Hollevoet | | 460/106 |
| 5,324,231 A * | 6/1994 | Van Herpe et al. | | 460/106 |
| 5,368,522 A | 11/1994 | Ricketts et al. | | |
| 5,443,421 A * | 8/1995 | Heintzman | | 460/106 |
| 5,882,257 A | 3/1999 | Cooksey et al. | | |
| 6,193,772 B1 * | 2/2001 | Wiefel | | 55/283 |
| 6,398,639 B1 * | 6/2002 | Dammann et al. | | 460/107 |
| 6,679,773 B2 * | 1/2004 | Schwersmann | | 460/70 |
| 6,979,261 B1 * | 12/2005 | Day et al. | | 460/59 |
| 8,062,109 B1 * | 11/2011 | Pearson et al. | | 460/59 |

* cited by examiner

*Primary Examiner* — Arpád Fábián-Kovács
(74) *Attorney, Agent, or Firm* — Seyed V. Sharifi T.; Patrick M. Sheldrake

(57) ABSTRACT

An intake feeder system having a stone separator mounted between a crop elevator and the mouth of a threshing mechanism disposed longitudinally in a combine harvester. The stone separator includes a rotary feed beater and a sump disposed beneath the feed beater. The feed beater serves to advance crop raised by the elevator along a crop flow path towards the mouth of the threshing mechanism and to propel stones in the crop into the sump. A duct is provided in parallel with the crop flow path for connecting a space above the rotary feed beater to the mouth of the threshing mechanism.

11 Claims, 4 Drawing Sheets

INTAKE FEEDER SYSTEM FOR A COMBINE HARVESTER

FIELD OF THE INVENTION

The present invention relates to an intake feeder system for a combine harvester.

BACKGROUND OF THE INVENTION

A combine harvester has at its front end an intake feeder system that cuts the crop from the ground and feeds it to a threshing mechanism. The intake feeder system comprises a header and an elevator that raises the crop to the level of the mouth of the threshing mechanism. Commonly, the header, which takes different forms depending on the type of crop, is wider than the elevator and is provided with two augers arranged one at each side of the header to push the cut crop towards the central elevator. The threshing mechanism separates the grain from the stalks, or straw, and the chaff. The grain is stored in a tank on board the harvester while the straw and the chaff are discharged from the rear end of the harvester.

The threshing is carried out by passing the crop between a rotating cylinder and a surrounding concave. The cylinder has threshing elements on its surface that separate the grain by beating and crushing the crop against the surrounding concave, and the latter has openings through which, the separated grain can fall to be transferred to the storage tank. Depending on the design of the harvester, the cylinder may be disposed longitudinally or transversely but the present invention is primarily concerned with harvesters having longitudinal threshing cylinders.

If rocks or large stones are picked up by the intake feeder system, they can damage the threshing mechanism. One way to prevent such damage is to detect stones by the noise they make as the crop is being advanced towards the mouth of the threshing mechanism and to prevent crop containing a stone from reaching the threshing mechanism. This method is not, however, entirely reliable as small stones buried in the crop may make less noise and may go undetected. Furthermore, the removal of each stone requires an interruption of the harvesting operation, thereby adding to the down time of the combine.

It has also been proposed to pass the crop through a stone or rock separator before it reaches the mouth of the threshing mechanism. An example of a stone separator is described in U.S. Pat. No. 5,882,257.

FIG. 1 of U.S. Pat. No. 5,882,257 is incorporated herein as FIG. 1 of the accompanying drawings. In FIG. 1, a combine harvester 10 has an intake feeder system 12 having a header with a cutter 14 and a reel 16, an elevator 18 and a stone separator 20 arranged between the top of the elevator 18 and the threshing mechanism 22. The stone separator 20 comprises a feed beater 26, in the form of a rotor with projecting paddles, arranged above a rock trap sump 28. The feed beater 26 conveys the crop towards the threshing mechanism 22 while rocks and foreign matter, which are generally heavier and denser than the crop, are impacted and downwardly discharged into the interior of the rock trap sump 28. The rotation of the feed beater 26 propels the rocks and foreign matter downwardly through straw and chaff into the rock trap sump. As a result, the rocks and foreign matter are separated from the crop prior and prevented from reaching the threshing mechanism 22.

It has been found, when a combine harvester intake feeder system is modified to incorporate such a stone separator 20 between the crop elevator 18 and the mouth of the threshing mechanism 22, that clouds of dust and debris are generated above the rotor 26 of the stone separator 20 and it is the aim of the present invention to avoid such clouds as they increase cab pollution and impair visibility.

SUMMARY OF THE INVENTION

According to a first aspect of the present invention, there is a provided a stone separator for mounting between a crop elevator and the mouth of a threshing mechanism in a combine harvester, the stone separator comprising a rotary feed beater and a sump disposed beneath the feed beater, the feed beater serving to advance crop raised by the elevator along a crop flow path towards the mouth of the threshing mechanism and to propel stones in the crop into the sump, wherein an air flow duct is provided in parallel with the crop flow path for connecting a space above the rotary feed beater to the mouth of the threshing mechanism.

In a second aspect of the invention, there is provided an intake feeder system for a combine harvester having a threshing mechanism, the intake feeder comprising an elevator for raising crop from a header to the level of the mouth of the threshing mechanism and a stone separator arranged at the upper end of the elevator to remove stones from the crop before the crop enters the mouth of the threshing mechanism, wherein the stone separator comprises a rotary feed beater and a sump disposed beneath the feed beater, the feed beater serving to advance crop raised by the elevator along a crop flow path towards the mouth of the threshing mechanism and to propel stones in the crop into the sump, and wherein an air flow duct is provided in parallel with the crop flow path for connecting a space above the rotary feed beater to the mouth of the threshing mechanism.

The invention further provides a combine harvester that incorporates a stone separator or an intake feeder system as set out above.

The problem created by the dust and debris cloud cannot be avoided by simply enclosing the rotary feed beater because the dust and debris would rapidly build up in the enclosed space. Instead, it is avoided in the present invention in that dust and debris are prevented from collecting in such a space by connecting the space to the mouth of the threshing mechanism. The action of the threshing mechanism, which has an auger at its lower end to propel the crop into the space between the threshing cylinder and the surrounding concave, creates a region of low (i.e. sub-atmospheric) pressure near its mouth. This low pressure causes a constant air flow through the air flow duct conveying dust and debris into the threshing mechanism. The dust and debris does not affect the threshing mechanism and it is simply discharged along with the chaff in the crop.

The lower end of the longitudinal threshing mechanism has a support plate within which the bearing of the cylinder is mounted. In an embodiment of the invention, holes are provided in the bearing plate to allow air to pass into the threshing mechanism from the space above the rotary feed beater.

Where the stone separator is formed as a separate unit, the duct may be defined by a rigid cover enclosing a space above the feed beater.

When the stone separator is integrated into the intake feeder and permanently secured to the upper end of the elevator, a complication arises if the inclination of the elevator relative to the threshing mechanism is adjustable. In this case, it is possible to use a rigid cover to enclose a space above the rotary feed beater and to provide openings in the rigid cover that are connected by a flexible duct to a region of the threshing mechanism under low pressure.

While U.S. Pat. No. 5,882,257 describes the feed beater as comprising three large paddles radiating from a central shaft, in an embodiment of the invention the feed beater comprises a rotor and a plurality of paddles, preferably eight, projecting from the circumference of the rotor, the paddles having a smaller radial extent than the radius of the rotor.

BRIEF DESCRIPTION OF THE DRAWINGS

The invention will now be described further, by way of example, with reference to the accompanying drawings, in which.

DETAILED DESCRIPTION OF THE PREFERRED EMBODIMENT(S)

Figure 1:
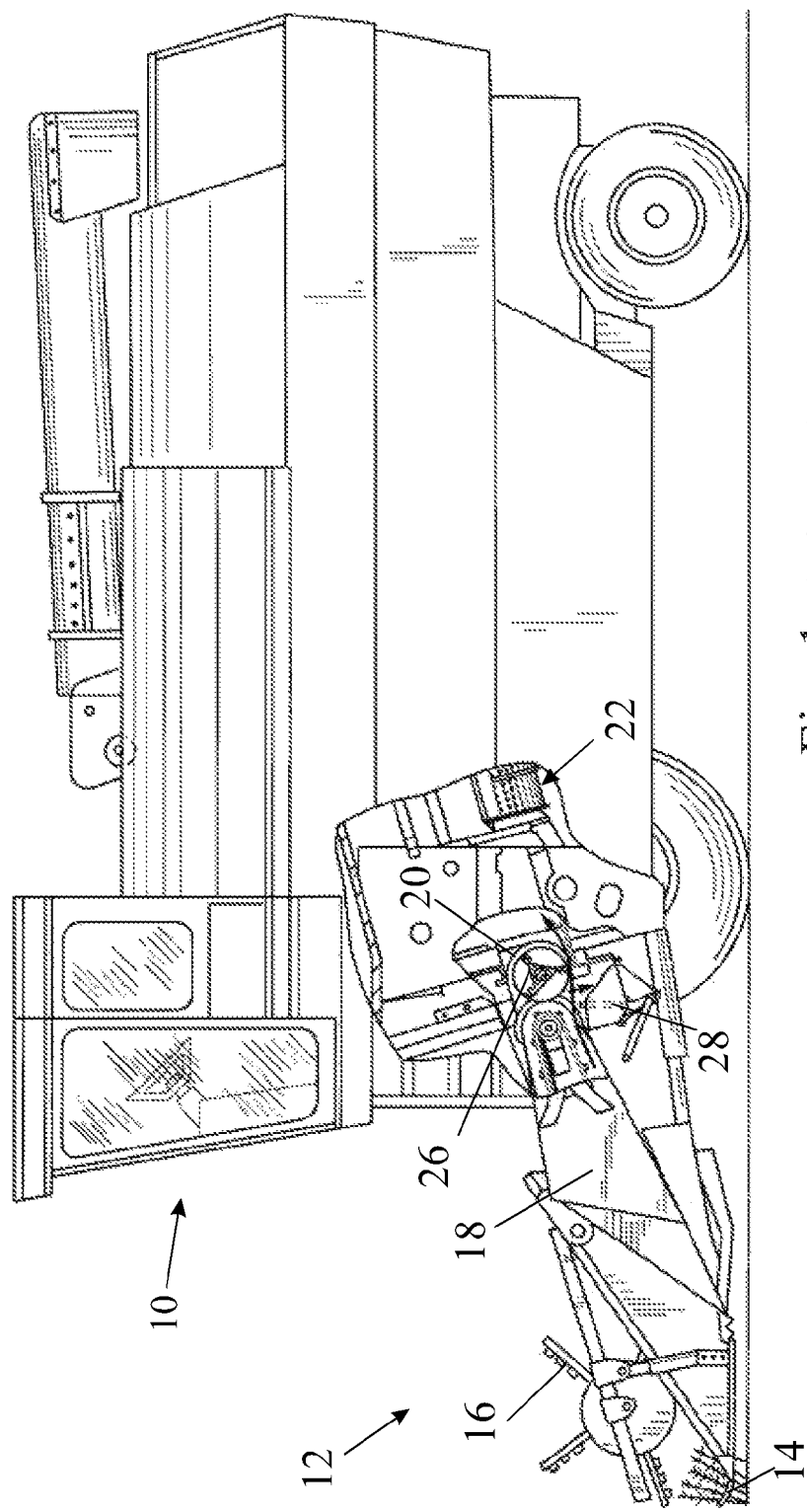
FIG. 1 is a side view (as earlier described) of a combine harvester, known from U.S. Pat. No. 5,882,257, fitted with a stone separator.
Figure 2:
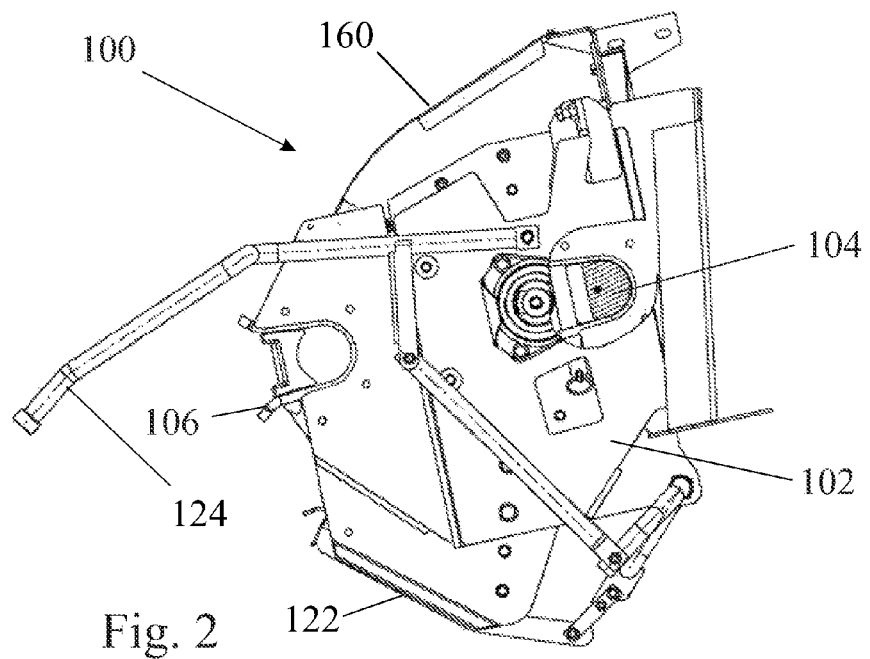
FIG. 2 is a side view of a stone separator of the invention.
Figure 3:
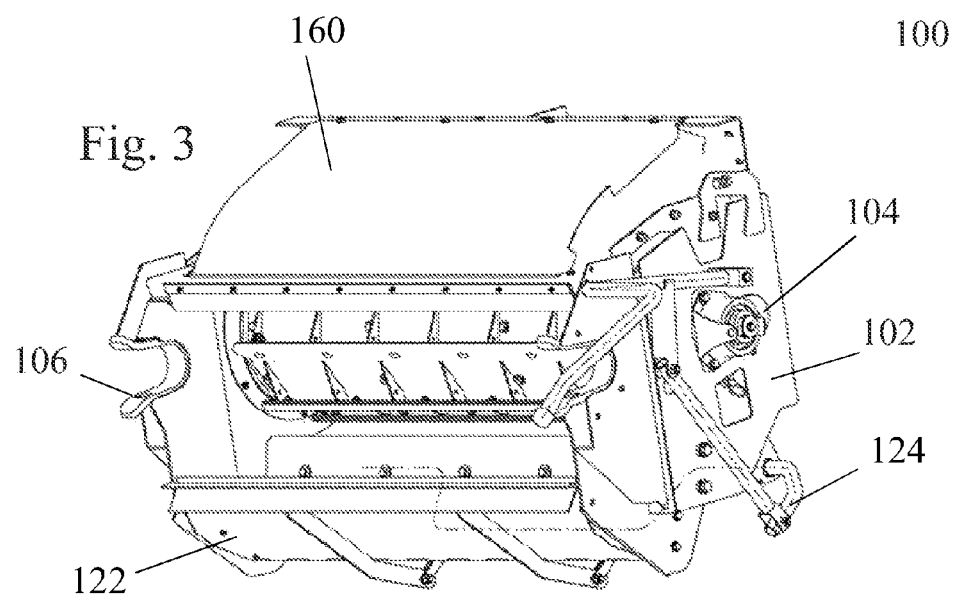
FIG. 3 is a perspective view of the stone separator shown in FIG. 2.
Figure 4:
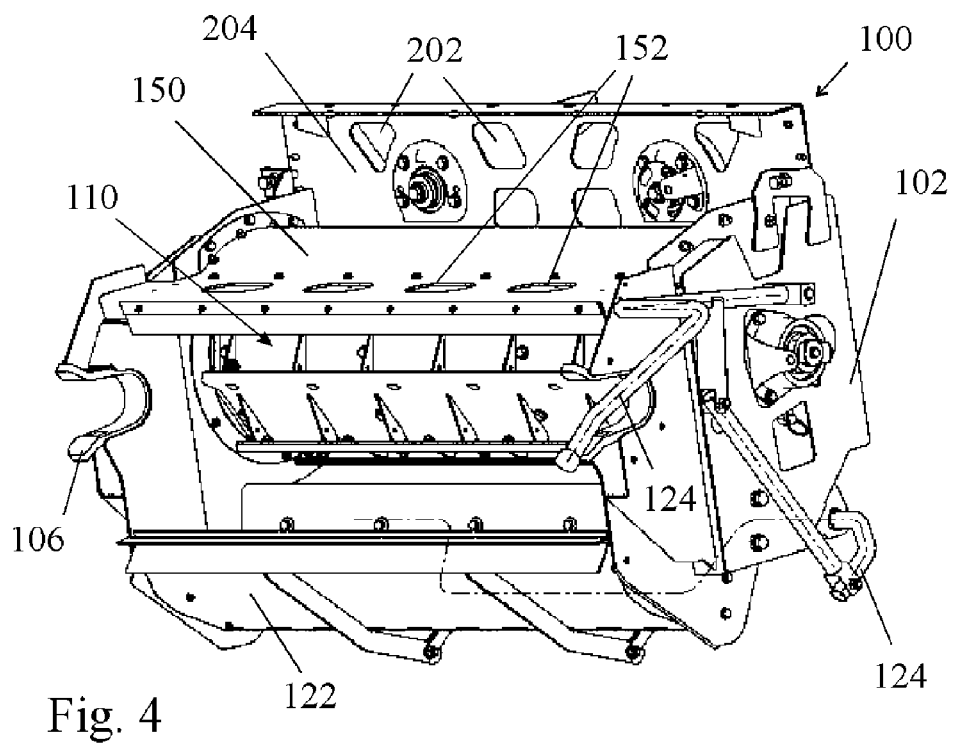
FIG. 4 is a view similar to that of FIG. 3 with the dust extraction duct removed to expose the bearing support plate of the threshing mechanism.

The stone separator 100 in FIGS. 2 to 5 comprises a frame 102 that is mounted during use between the elevator 136 and the threshing mechanism 200 of a combine harvester using the same design of fixings as used to connect the elevator 136 directly to the body of the threshing mechanism. In particular, the frame has two D-shaped spigots 104, arranged one on each side of the frame that have an identical contour to the mounting members to be found on the upper end of the elevator. The frame 102 also has two forks 106 identical to those to be found on the body of the threshing mechanism for receiving the mounting members of the elevator. In this way, the stone separator can be mounted between the elevator and the threshing mechanism or it may be removed to allow the elevator to be connected directly to the threshing mechanism.

Figure 5:
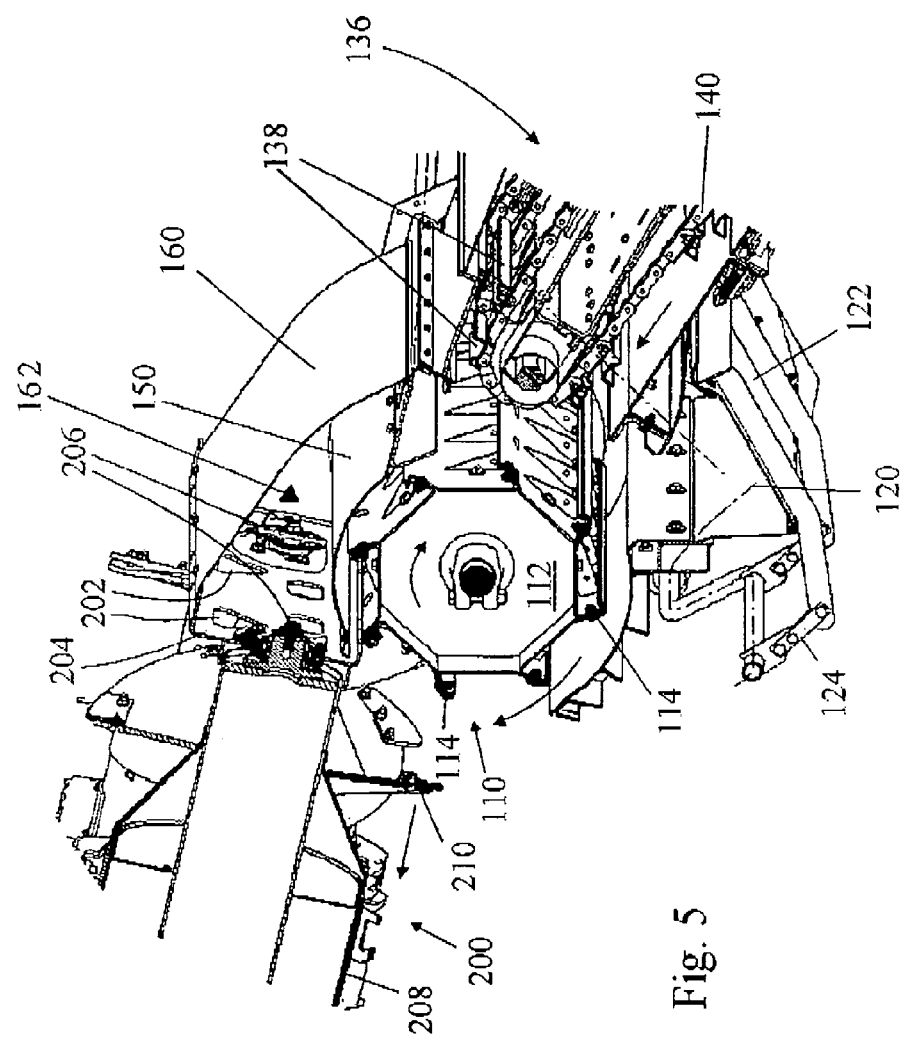
FIG. 5 is a perspective section through the stone separator of FIGS. 2 to 4, fitted with an elevator and mounted to a threshing mechanism.

The elevator 136, which is shown in FIG. 5, is generally conventional. Typically the elevator may comprise a plurality of slats 138 extending transversely between two parallel endless chains 140 driven at the same speed. The crop passes through a gap between the lower run of the slats and a stationary guide plate and is pushed along the gap by the slats.

A feed beater 110, in the form of a rotor 112 with projecting paddles 114 is rotatably mounted in the frame 102 and preferably driven at high speed. The direction of rotation of the rotor 112 and the crop flow path through the stone separator are shown by arrows in FIG. 5. The rotation of the rotor 112 advances the crop along the crop flow path but its surface velocity is higher than the speed of crop movement so that the paddles 114 beat the crop as it moves toward the threshing mechanism. The impact of the paddles pushes stones and rocks downward and they collect in a sump 120. The sump has a door 122 that can be opened by the operator using a system of levers 124 so that it may be emptied from time to time. Aside from the design of the feed beater 110, the stone separator as so far described is generally similar to that described in U.S. Pat. No. 5,882,257 and operates on the same principle.

The design of the feed beater in the illustrated embodiment of the invention is improved in that in place of three paddles extending radially from a shaft, the feed beater has eight paddles 114 distributed about the circumference of a closed rotor body 112 of which the radius is greater than the radial extent of the paddles 114.

The operation of the header, elevator 136, beater 110 and threshing mechanism 200 creates a great deal of dust and other debris, such as stem and leaf particles. Where no feed beater was installed, the front section of the threshing mechanism 200 sucked in this material together with the threshable crop. However, the installation of a closed rotor body 112 at the mouth of the threshing mechanism 200 impedes this sucking action, and the dust and debris arriving at the top of the elevator are forced outwardly through every clearance or hole present in or near the stone separator. As a result, an unacceptable dust cloud is created around the stone separator.

To avoid this problem, the illustrated embodiment of the invention has a top plate 150 extending between the rear end of the elevator 136 and the front end of the threshing mechanism 200. The front section of the top plate 150, before the rotor 112, is provided with an array of holes 152. A cover plate 160 is provided above the top plate 150, forming a duct 162 enclosing the space above the feed beater 110. This duct 162 communicates with the interior of the threshing mechanism 200 (see FIG. 5) through openings 202 shown in FIGS. 4 and 5 formed in the support plate 204 that carries the bearings 206 of the threshing cylinders.

The illustrated embodiment has two threshing cylinders but there need only be one.

Each threshing cylinder has an auger section 210 at its lower end which creates a negative pressure at the mouth of the threshing mechanism. As a result, dust and debris present at the holes 152 is drawn into the duct 162 and sucked into the threshing mechanism through the openings 202. The debris thus passes through the threshing mechanism to be discharged with chaff from the crop and does not create any pollution surrounding the cab of the harvester.

If the stone separator is integrated into the crop elevator, the ability to adjust the inclination of the elevator may preclude the use of a rigid cover 160 as described above. Instead, it would be possible to provide a flexible duct connecting the holes 152 in the place 150 to the mouth of the threshing mechanism 200.

It is preferred for the elevator chain 140 to be driven independently from the rotor of the stone separator 100. The feeder has a relatively small inertia, and can be stopped immediately when unwanted material has been ingested. However, the rotor 112 has a substantial mass and high inertia when it is rotated at high speed. If the drivelines of drum and feeder were to be combined, the inertia of the drum would still drive the elevator after interrupting the power and still draw the unwanted material up into the threshing system. As an alternative to providing independent drives, the stone separator may be driven by way of an over-running or one-way clutch to permit to continue to rotate after the elevator chain has been brought to a standstill.

The invention claimed is:

1. An intake feeder system for a combine harvester comprising:
   a stone separator that is positioned at a mouth of a threshing mechanism, the stone separator having a top plate extending between an elevator and a front end of the threshing mechanism of the combine harvester, the stone separator with a sump that receives stones propelled by the stone separator,
   a plurality of boundaries that define an array of holes in the top plate,
   a feed beater that is associated with the stone separator;

a cover plate positioned above the top plate to form a duct for flow of air, the duct encloses a space above the feed beater, a support plate that supports bearings of the threshing mechanism, the support plate having openings that enable air passage into an interior of the threshing mechanism the openings for a suction of an air flow from the duct directly into the threshing mechanism of the combine harvester after the airflow has been exposed to operation of the feed beater, the suction of the airflow created to draw dust via a negative pressure from operation of the threshing mechanism.

2. The intake feeder system of claim 1, wherein the-duct is a rigid cover overlying the feed beater.

3. The intake feeder system of claim 1, wherein the feed beater comprises a rotor having a plurality of paddles of smaller radial extent than a radius of a rotor and projecting from its circumference.

4. The intake feeder system of claim 1, wherein the feed beater comprises a rotor having a closed body.

5. The intake feeder system of claim 1, wherein the duct connects a front section of the stone separator to the mouth of the threshing mechanism.

6. The intake feeder system of claim 5, wherein the plurality of openings enable passage of air with the duct.

7. An intake feeder system for a combine harvester having a threshing mechanism, the intake feeder comprising:

an elevator for raising crop from a header to a level of a mouth of the threshing mechanism;

a stone separator arranged at an end of the elevator to remove stones from the crop before the crop enters the mouth of the threshing mechanism, the stone separator further comprises:

a rotary feed beater;

a sump disposed beneath the rotary feed beater, the rotary feed beater serving to advance crop raised by the elevator along a crop flow path towards the mouth of the threshing mechanism and to propel stones in the crop into the sump, and a top plate extending between the elevator and the mouth of the threshing mechanism;

a plurality of boundaries that define an array of holes in the top plate; and;

a cover plate that is positioned above the top plate to form an enclosure above the rotary feed beater;

a support plate that supports bearings of the threshing mechanism, the support plate with openings that facilitate suction of an air flow from the enclosure right into the threshing mechanism, the suction of the airflow created to draw dust via a negative pressure from operation of the threshing mechanism.

8. The intake feeder system of claim 7, wherein the enclosure comprises a rigid plate assembly.

9. The intake feeder system of claim 7, wherein the feed beater includes a rotor having a plurality of paddles of smaller radial extent than the radius of the rotor and projecting from its circumference.

10. The intake feeder system of claim 7, wherein the feed beater includes a rotor having a closed body.

11. The intake feeder system of claim 7, wherein the threshing system is a longitudinal threshing system, including at least one threshing cylinder.

* * * * *